United States Patent
Ayres et al.

(10) Patent No.: US 8,275,216 B2
(45) Date of Patent: Sep. 25, 2012

(54) METHOD AND SYSTEM FOR EQUALIZING HOLOGRAPHIC DATA PAGES

(75) Inventors: Mark R. Ayres, Boulder, CO (US); Adrian J. Hill, Lyons, CO (US)

(73) Assignee: InPhase Technologies, Inc., Longmont, CO (US)

( * ) Notice: Subject to any disclaimer, the term of this patent is extended or adjusted under 35 U.S.C. 154(b) by 1346 days.

(21) Appl. No.: 10/879,847

(22) Filed: Jun. 28, 2004

(65) Prior Publication Data

US 2005/0286387 A1 Dec. 29, 2005

(51) Int. Cl.
*G06K 9/32* (2006.01)
(52) U.S. Cl. ............ 382/294; 358/483; 359/21; 359/22; 359/245; 365/125; 369/103; 382/210; 382/232; 382/275; 382/288
(58) Field of Classification Search .................. 382/294, 382/151
See application file for complete search history.

(56) References Cited

U.S. PATENT DOCUMENTS

| | | | |
|---|---|---|---|
| 5,511,058 A | 4/1996 | Visel et al. | |
| 5,528,702 A | 6/1996 | Mitsuoka et al. | |
| 5,694,488 A * | 12/1997 | Hartmann | 382/210 |
| 5,838,650 A * | 11/1998 | Campbell et al. | 369/103 |
| 5,940,537 A * | 8/1999 | Regen et al. | 382/210 |
| 5,949,558 A * | 9/1999 | Psaltis et al. | 359/22 |
| 5,963,675 A | 10/1999 | Van der Wal et al. | |
| 5,982,513 A * | 11/1999 | Zhou et al. | 359/22 |
| 6,064,586 A * | 5/2000 | Snyder et al. | 365/125 |
| 6,222,754 B1 * | 4/2001 | Goto et al. | 365/125 |
| 6,226,415 B1 * | 5/2001 | Wilson et al. | 382/275 |
| 6,233,083 B1 * | 5/2001 | Minagawa | 359/245 |
| 6,285,474 B1 | 9/2001 | Kawano et al. | |
| 6,414,296 B1 * | 7/2002 | Edwards | 250/208.1 |
| 6,414,763 B1 * | 7/2002 | Hesselink et al. | 359/21 |
| 6,687,419 B1 | 2/2004 | Atkin | |
| 6,697,316 B2 * | 2/2004 | Burr | 369/103 |
| 6,847,907 B1 | 1/2005 | Novotny | |
| 7,079,469 B2 * | 7/2006 | Itoh et al. | 369/103 |
| 7,116,626 B1 * | 10/2006 | Woods et al. | 369/103 |

(Continued)

FOREIGN PATENT DOCUMENTS

EP 817201 A2 * 1/1998

OTHER PUBLICATIONS

Burr, G.W. (Apr. 1, 2002). "Holographic Data Storage with Arbitrarily Misaligned Data Pages," *Optics Letters* 27(7):542-544.

(Continued)

*Primary Examiner* — Tsung-Yin Tsai
(74) *Attorney, Agent, or Firm* — Ajay A. Jagtiani; Vedder Price, PC (57) ABSTRACT

Methods and systems for equalizing a holographic image page and for compensating nonlinearity of a holographic data storage channel are disclosed. In one embodiment, a method for equalizing a holographic image page includes receiving the holographic image page and dividing the holographic image page into a plurality of local image regions. The method further includes generating a local alignment error vector for each local image region, computing a local finite impulse response kernel for each local image region according to the corresponding local alignment error vector, and adjusting misaligned pixels of each local image region using the corresponding local finite impulse response kernel.

33 Claims, 6 Drawing Sheets

U.S. PATENT DOCUMENTS

| | | | |
|---|---|---|---|
| 7,469,066 B2 * | 12/2008 | Endo et al. | 382/232 |
| 7,492,692 B2 * | 2/2009 | Tateishi et al. | 369/103 |
| 7,903,527 B2 * | 3/2011 | Lee et al. | 369/103 |
| 2002/0041705 A1 | 4/2002 | Lin et al. | |
| 2002/0094116 A1 | 7/2002 | Frost et al. | |
| 2003/0044084 A1 * | 3/2003 | Endo et al. | 382/288 |
| 2003/0092194 A1 | 5/2003 | Gambini et al. | |
| 2004/0027668 A1 | 2/2004 | Ayres et al. | |
| 2004/0179738 A1 | 9/2004 | Dai et al. | |
| 2005/0286096 A1 * | 12/2005 | Yoon | 358/483 |
| 2008/0205238 A1 * | 8/2008 | Hwang et al. | 369/103 |

OTHER PUBLICATIONS

Chugg, K.M. et al. (Mar. 1999). "Two-Dimensional Equalization in Coherent and Incoherent Page-Oriented Optical Memory," *J. Opt. Soc. Am. A* 16(3):549-562.

Heanue, J.F. et al. (May 10, 1996). "Signal Detection for Page-access Optical Memories with Intersymbol Interference," *Applied Optics* 35(14):2431-2438.

Menetrier, L. et al. (Feb. 10, 2003). "Density Implications of Shift Compensation Postprocessing in Holographic Storage Systems," *Applied Optics* 42(5):845-860.

Redfield, S. et al. (2000). "Tamarack Optical Head Holographic Storage," In *Holographic Data Storage*, Coufal, H.J et al. eds., Springer-Verlag, New York, NY. pp. 343-357.

Shelby, R.M. et al. (Oct. 1, 1997). "Pixel-matched Holographic Data Storage with Megabit Pages," *Optics Letters* 22(19):1509-1511.

Smith, J.O. et al. (1984). "A Flexible Sampling-Rate Conversion Method," *Proc. IEEE Int. Conf. Acoustic Speech Signal Processing* 2:19.4.1-19.4.4.

Vadde, V. et al. (1997). "Channel Estimation and Intra-Page Equalization for Digital Volume Holographic Data Storage," *Optical Data Storage* 3109:245-250.

Yoon, P. et al. (2004). "Image Compensation for Sub-pixel Misalignment in Holographic Data Storage," *ISOM Proceedings*, two pages.

Vadde, V. et al. (1999). "Channel Modeling and Estimation for Intrapage Equalization in Pixel-Matched Volume Holographic Data Storage," *Applied Optics* 38:20, 4374-4386.

Keskinoz, M. et al. (1999). "Application of Linear Minimum Mean-Squared-Error Equalization for Volume Holographic Data Storage," *Applied Optics* 38:20, 4387-4393.

Burr, G. et al. (2001). "Compensation for Pixel Misregistration in Volume Holographic Data Storage," *Optical Society of America* 26:8, seven pages.

Keskinoz, M. (2004). "Discrete Magnitude-Squared Channel Modeling, Equalization, and Detection for Volume Holographic Storage Channels," *Applied Optics* 43:6, 1368-1378.

Vadde, V. et al. (1999). "Channel Modeling and Estimation for Intrapage Equalization in Pixel-matched ?volume Holographic Data Storage," *Applied Optics* 38:20, 4374-4386.

Burr, G. et al. (2000). "Compensation for Pixel Misregistration in Volume Holographic Data Storage," *Optics Letters* 26:8, 542-544.

Keskinoz M. et al. (2004). "Discrete Magnitude-Squared Channel Modeling, Equalization, and Detection for Volume Holographic Storage Channels," *Applied Optics* 43:6, 1368-1378.

International Search Report mailed on Oct. 3, 2008, for PCT Application No. PCT/US06/07046, filed on Feb. 27, 2006, six pages.

Written Opinion mailed on Oct. 3, 2008, for PCT Application No. PCT/US06/07046, filed on Feb. 27, 2006, six pages.

Final Office Action mailed on Apr. 27, 2009, for U.S. Appl. No. 11/069,007, filed Feb. 28, 2005, sixteen pages.

Non-Final Office Action mailed on Sep. 26, 2008, for U.S. Appl. No. 11/069,007, filed Feb. 28, 2005, fifteen pages.

Non-Final Office Action mailed on Jul. 21, 2009, for U.S. Appl. No. 11/069,007, filed Feb. 28, 2005, fourteen pages.

Non-Final Office Action mailed on Dec. 29, 2009, for U.S. Appl. No. 11/069,007, filed Feb. 28, 2005, seventeen pages.

\* cited by examiner

METHOD AND SYSTEM FOR EQUALIZING HOLOGRAPHIC DATA PAGES

FIELD OF THE INVENTION

The present invention relates to the field of holographic data storage system. In particular, the present invention relates to a method and system for equalizing holographic data pages.

BACKGROUND OF THE INVENTION

Holographic data storage systems store information or data based on the concept of a signal beam interfering with a reference beam at a holographic storage medium. The interference of the signal beam and the reference beam creates a holographic representation, i.e., a hologram, of data elements as a pattern of varying refractive index and/or absorption imprinted in a volume of a storage or recording medium such as a photopolymer or photorefractive crystal. Combining a data-encoded signal beam, referred to as an object beam, with a reference beam creates the interference pattern at the storage medium. A spatial light modulator (SLM), for example, can create the data-encoded signal beam. The interference pattern induces material alterations in the storage medium that generate the hologram. The formation of the hologram in the storage medium is a function of the relative amplitudes and polarization states of, and phase differences between, the signal beam and the reference beam. The hologram is also dependent on the wavelengths and angles at which the signal beam and the reference beam are projected into the storage medium. After a hologram is created in the storage medium, projecting the reference beam into the storage medium reconstructs the original data-encoded signal beam. The reconstructed signal beam may be detected by using a detector, such as CMOS photo-detector array or the like. The detected data may then be decoded into the original encoded data.

In a page-oriented holographic data storage device, it is advantageous to minimize the size of the holograms in order to achieve maximum storage density. One method of accomplishing this is minimizing the size of the page imaging aperture. However, minimizing the size of the aperture has the consequence of increasing blur, in terms of broadening the pixel spread function (PSF) in the page images. This blur decreases the signal-to-noise ratio (SNR) of the holographic storage device, which increases the bit error rate (BER) of the system, and which in turn limits the storage density.

Since blur in an image is a deterministic process, much of the SNR loss may be reclaimed by digitally post-processing the detected page image. Traditionally, the detected image is convolved with a small kernel matrix w, also known as a kernel, representing an inverse blurring operation (de-convolution), thereby implementing a finite impulse response (FIR) filter equalization.

The kernel of a FIR filter, for example a 3×3 or a 5×5 matrix, may be determined by several methods known in the current art. For example, if the page image pixel spread function is known, a zero-forcing equalizer may be designed by calculating the linear inverse of the PSF. An example of the zero-forcing method is described in "Channel estimation and intra-page equalization for digital volume holographic data storage," by V. Vadde and B. Kumar in Optical *Data Storage* 1997, pp. 250-255, 1997. Another approach is to choose FIR filter coefficients that minimize the difference between the equalized data page image and the original data page. Such a method is described in "Application of linear minimum mean-squared-error equalization for volume holographic data storage," by M. Keskinoz and B. Kumar in *Applied Optics*, vol. 38, no. 20, Jul. 10, 1999.

Performance of FIR equalization as shown in the prior art is limited in at least two aspects. First, blur in a coherent imaging system is not a linear process. Although coherent light adds linearly in electric field strength, detectors can only directly detect irradiance. This introduces a nonlinear absolute value squared transformation. Furthermore, each detector element (pixel) integrates the irradiance over an area, introducing a further nonlinearity. Prior art has disclosed ways to solve this problem either through a "magnitude model" (operating on the square root of the detected values, but lacking phase information), or through an "intensity model" (operating on the PSF and the pixel fill factors). An example of both the "magnitude model" and the "intensity model" is described in "Channel modeling and estimation for intra-page equalization in pixel-matched volume holographic data storage," by V. Vadde and B. Kumar in *Applied Optics*, vol. 38, no. 20, Jul. 10, 1999.

Second, the performance of FIR equalization described by the prior art is limited because real imaging systems are not perfect shift invariant linear systems. In other words, the pixel spread function is not constant at all locations in the field of view. There are a number of factors that create variations in the width or shape of the PSF throughout the field of view. For example, variations may be caused by lens aberrations and misalignment; by distortions, shrinkage, and other non-ideal media responses; and by misalignment and wavefront errors in the reconstructing reference beam. A significant consequence of these effects in a pixel-matched system is the degradation of the pixel matching, because image distortion shifts local areas of the image with respect to the detector pixels. For example, a uniform shrinkage of the medium causes the holographic image to be magnified, producing a radial displacement such that data pixel images are no longer centered on their respective detector pixels.

Therefore, new methods and systems for addressing the issues of the prior art methods are needed. In particular, methods and systems for equalizing holographic image data are needed to improve the storage density of the holographic data storage system. Further, methods and systems for compensating nonlinearity of the holographic data storage channel are also needed to improve the storage density of the holographic data storage system.

SUMMARY

A method for equalizing a holographic image page includes receiving the holographic image page and dividing the holographic image page into a plurality of local image regions. The method further includes generating a local alignment error vector for each local image region, computing a local finite impulse response kernel for each local image region according to the corresponding local alignment error vector, and adjusting misaligned pixels of each local image region using the corresponding local finite impulse response kernel.

In another embodiment, a method for compensating nonlinearity of a holographic data storage channel includes selecting a metric for measuring data accuracy of a holographic image page and computing a set of values of the metric over a predetermined set of linearization exponents. The method further includes selecting a desired linearization exponent for generating a desired value of the metric that corresponds to a desired data accuracy of the holographic image page, and adjusting the nonlinearity of the holographic data storage channel in accordance with the desired linearization exponent.

In yet another embodiment, a method for equalizing a holographic image page includes receiving the holographic image page and dividing the holographic image page into a plurality of image regions, and deriving an expected blur and an actual blur for each image region. The method further includes computing a pixel-signal-error-ratio between the actual blur and the expected blur for each image region, computing a local finite impulse response kernel in accordance with the pixel-signal-error-ratio and a predetermined global final impulse response, and adjusting misaligned pixels of each local image region using the corresponding local finite impulse response kernel.

BRIEF DESCRIPTION OF THE DRAWINGS

The aforementioned features and advantages of the invention as well as additional features and advantages thereof will be more clearly understood hereinafter as a result of a detailed description of embodiments of the invention when taken in conjunction with the following drawings.

Like numbers are used throughout the figures.

DESCRIPTION OF EMBODIMENTS

Methods and systems are provided for equalizing holographic image pages and for compensating nonlinearity of a holographic data storage system. The following description is presented to enable any person skilled in the art to make and use the invention. Descriptions of specific techniques and applications are provided only as examples. Various modifications to the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed herein.

In a holographic data storage system, the detector (camera) is typically aligned with the holographic image during a read operation such that each pixel in the image is centered on a single pixel on the detector. This alignment process is generally referred to as "pixel matching." The objective of "pixel matching" is to sample the holographic images of data-containing holograms on the detector in a manner that preserves the information content so that the detected image that have a low bit error rate (BER). Pixel misalignment may occur because one or more components of the holographic data system may be translated or rotated causing translational, tilted, rotational, magnification, or defocusing errors in the detected image. Misalignment, unless otherwise indicated, may refer to one or more of translational, tilt, rotational, magnification, or defocusing errors of the detected image.

Equalizing a Holographic Image Page

Figure 1:
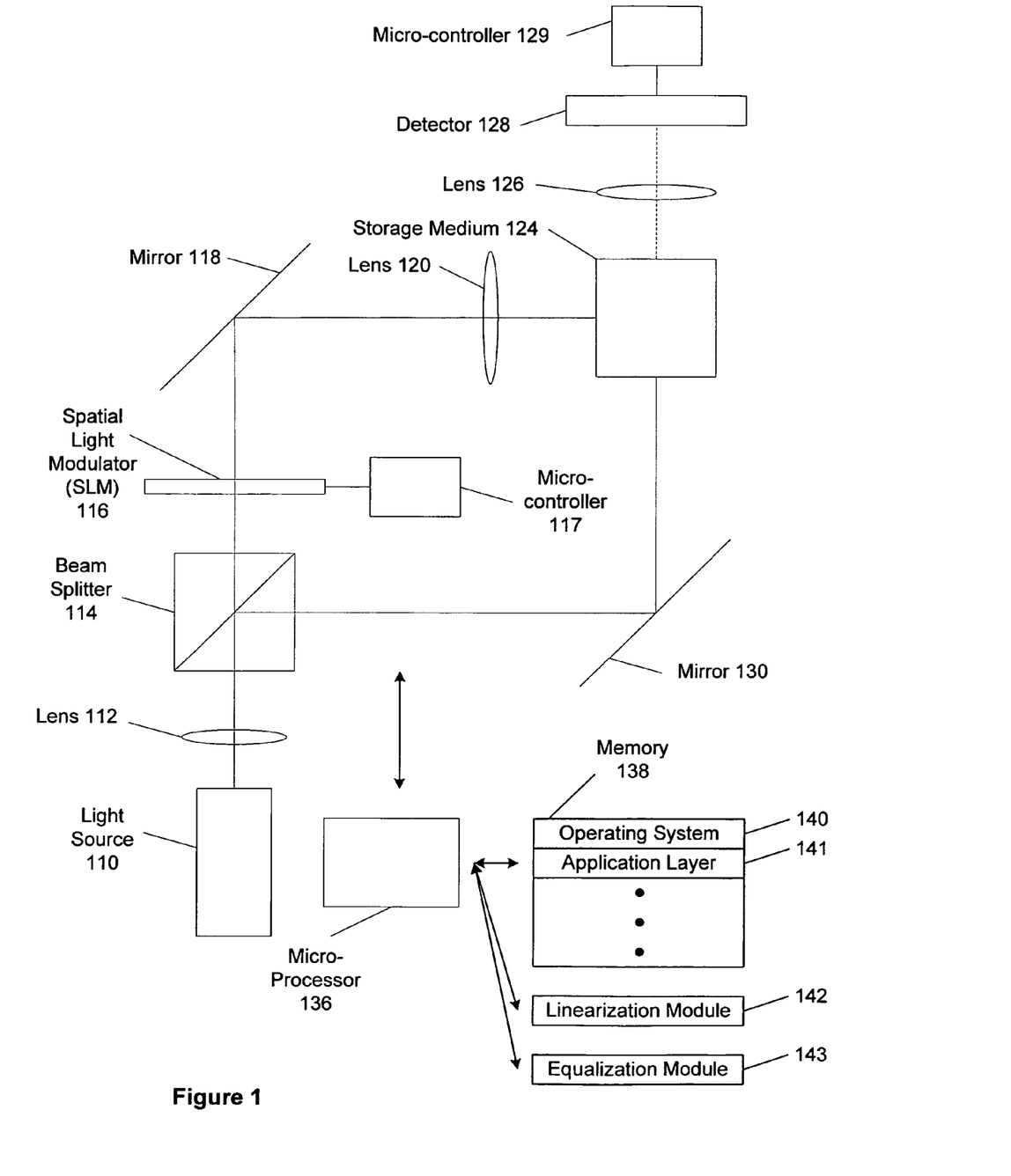
FIG. 1 illustrates a holographic data storage system according to an embodiment of the present invention.

FIG. 1 illustrates a holographic data storage system according to an embodiment of the present invention. The holographic data storage system includes a light source 110, a first lens 112, a beam splitter 114, a SLM 116, a first microcontroller 117. The holographic data storage system further includes a first mirror 118, a second lens 120, a storage medium 124, a third lens 126, a detector 128, a second microcontroller 129, a second mirror 130, a microprocessor 136 and a memory 138. The memory 138 comprises an operating system 140, an application layer 141, an equalization module 142 and a linearization module 143.

In one embodiment, the light source 110 is a laser for providing a coherent beam of light. The beam splitter 114 is positioned to split the laser beam into an object beam and a reference beam. The object beam is directed to the SLM 116 where it is encoded, for example, by an encoding unit within the first microcontroller 117. The object beam is encoded with data associated with a data page that creates a two-dimensional image signal. The signal beam, modulated with the data page image, is then directed to the recording storage medium 124 via the first mirror 118.

The first microcontroller 117 may include software and/or hardware capable of encoding data sequences into pixel values by appropriately addressing the array of addressable elements of the SLM 116. The first microcontroller 117 may also encode various registration marks or known pixel patterns for determining misalignments, i.e., rotation, translation, and the like of the SLM 116, storage medium 124, or detector 128. For example, the first microcontroller 117 may include an encoder and/or a decoder, or the like, and may address the SLM 116 and detector 128 through firmware commands or the like.

The microprocessor 136 communicates (as indicated by the double arrow) with the first microcontroller 117 as well as the memory 138 and other components of the system. The memory 138 may include high-speed random access memory and may include non-volatile memory, such as a flash RAM. The memory 138 may also include mass storage that is remotely located from the microprocessor 136. The memory 138 preferably stores:

an operating system 140 that includes procedures for handling various basic system services and for performing hardware dependent tasks; and an application layer 141 for interfacing between the operating system and other applications of the holographic data storage system.

The microprocessor 136 further communicates with an equalization module 142 and a linearization module 143 of the holographic data storage system, where the equalization module 142 reduces the variations of signal intensity for both the ON and OFF pixels; and the linearization module 143 compensates the channel nonlinearity of the holographic data storage system.

The equalization module 142 and the linearization module 143 may include executable procedures, sub-modules, tables and other data structures. In other embodiments, additional or different modules and data structures may be used, and some of the modules and/or data structures listed above may not be used. The equalization module 142 and the linearization module 143 may be implemented in software and/or in hardware. When implementing in hardware, the equalization module 142 and the linearization module 143 may be implemented in application specific integrated circuits (ASICs) or in field programmable gate arrays (FPGAs).

The holographic data storage system of FIG. 1 may also include micro-actuators (not shown) configured to move at least one of the SLM 116, detector 128, and recording medium 124. According to one example, micro-actuators may be controlled, for example, by the first microcontroller 117 or the second microcontroller 129 through microprocessor 136. Microprocessor 136 may receive signals from detector 128 and use a servo feedback loop or the like to move at least one of the SLM 116, detector 128, or recording medium 124 to increase the performance of the holographic storage device. For example, an error signal associated with a misalignment may be sent to the first microcontroller 117 or the second microcontroller 129 (or a micro-controller controlling the position of storage medium 124) to activate one or more micro-actuators.

Generally, alignment of holographic components is set at the time of manufacturing. Over time, however, the components may become misaligned due to vibrations, shocks, temperature changes, medium shrinkage, and the like. The spatial extent over which stored holograms have useable signal-to-noise ratio (SNR) may be approximately only a few microns or less. Therefore, even slight movement of the hologram based on movements of the SLM, detector, or storage medium due to mechanical error, vibration, temperature change, medium shrinkage, and the like often degrades the performance of the holographic system.

In the U.S. patent application Ser. No. 10/305,769, entitled "Micro-Positioning Movement of Holographic Data Storage System Components", filed on Nov. 27, 2002 and commonly owned by InPhase Technologies, Inc., a method is disclosed for measuring page misalignment at local regions of the image by performing a cross-correlation between a part of the image and a known portion of the data page. The entire content of the Ser. No. 10/305,769 application is incorporated herein by reference. The Ser. No. 10/305,769 application further discloses how the method for measuring page misalignment may be applied at a plurality of sample positions within an image in order to generate a map of pixel misalignment over the whole image. The misalignment at each sample position is a vector with two alignment error components, $e=(\Delta x, \Delta y)$, representing the x and y misalignment, respectively, measured in pixels. Given this measured misalignment information about an image, the disclosed method utilizes the alignment error vector in improving the performance of FIR equalization.

In one embodiment, an image page is divided into n local image regions, each of which is characterized by a local alignment error vector $e_i$ (i=1 . . . n). Then, each local image region is equalized with a local FIR kernel, $w_i$, which is a modified version of the global FIR kernel, w. In other words, the method determines the magnitude and direction of the local pixel alignment error for each local image region, and then compensates the local FIR kernel $w_i$ accordingly in order to remove the local pixel alignment error. In particular, $w_i$ is formed by shifting w in the opposite direction of $e_i$ so as to reverse the effects of the local pixel alignment error. For example, in the case where w is a 3-by-3 matrix, w is of the form $$w = \begin{bmatrix} w_{11} & w_{12} & w_{13} \\ w_{21} & w_{22} & w_{23} \\ w_{31} & w_{32} & w_{33} \end{bmatrix}.$$

One approach to obtain the global w matrix is by applying the linear minimum mean-squared-error (LMMSE) method over an entire known image page. Assuming $0 \leq \Delta x_i \leq 1$ and $0 \leq \Delta y_i \leq 1$ (i.e., the local pixel alignment error is positive and less than one pixel), then the local $w_i$ is computed according to the following equation:

$$w_i = (1-\Delta x_i)(1-\Delta y_i) \begin{bmatrix} w_{11} & w_{12} & w_{13} \\ w_{21} & w_{22} & w_{23} \\ w_{31} & w_{32} & w_{33} \end{bmatrix} + \qquad \text{(Eqn. 1)}$$

$$\Delta x_i (1-\Delta y_i) \begin{bmatrix} 0 & w_{11} & w_{12} \\ 0 & w_{21} & w_{22} \\ 0 & w_{31} & w_{32} \end{bmatrix} +$$

$$(1-\Delta x_i)\Delta y_i \begin{bmatrix} 0 & 0 & 0 \\ w_{11} & w_{12} & w_{13} \\ w_{21} & w_{22} & w_{23} \end{bmatrix} + \Delta x_i \Delta y_i \begin{bmatrix} 0 & 0 & 0 \\ 0 & w_{11} & w_{12} \\ 0 & w_{21} & w_{22} \end{bmatrix}.$$

In this example, $w_i$ is shifted rightwards and downwards compared to w, implying that the coordinate system has been defined so that positive $\Delta x$ and $\Delta y$ correspond to leftwards and upwards, respectively. In other embodiments, $w_i$ may be shifted in the other three quadrants (i.e., $\Delta x$ and/or $\Delta y$ is negative), or the shifts ($\Delta x$ and $\Delta y$) may be greater than one, and Equation 1 may be rewritten to compensate shifts in other quadrants or changes in ranges of $\Delta x$ and $\Delta y$.

One of the benefits of the technique described above is that instead of determining each $w_i$ matrix for each local region from scratch, which typically requires having advanced knowledge of the input image and performing many computations, each $w_i$ matrix is determined according to the global w matrix and the local pixel alignment error vector. The local $w_i$ matrix is constrained in such way that only the degrees of freedom corresponding to pixel misalignment are allowed to be adjusted. Therefore, the amount of computation required in determining the local $w_i$ matrix is significantly reduced. In addition, the technique is less noise prone because it has a more accurate estimate of the $w_i$ matrix by using the local pixel alignment error that has two degrees of freedom as opposed to noise contributions from nine degrees of freedom if one were to generate the $w_i$ matrix from scratch.

In an alternative embodiment, the magnitude of the shift applied to the local FIR kernel $w_i$ may not be exactly equal to the local pixel alignment error ($\Delta x_i$, $\Delta y_i$), but rather equal to a scaled version of the local pixel alignment error, ($a_x \Delta x_i$, $a_y \Delta y_i$). The value of the scaling factors $a_x$ and $a_y$ would be determined by optimizing one or more performance metrics.

An exemplary range of the scaling factors is $0<|a_x|<1$, and $0<|a_y|<1$, i.e., the optimal amount of shift is less than the full alignment error.

In other embodiments, different performance metrics may be employed to determine the scaling factors, including but not limited to signal-to-noise ratio, bit error rate or least mean square error. In addition, either experimental data or theoretical (simulated) data may be used to determine the scaling factors. Further, the scaling factors $a_x$ and $a_y$ include certain amount of noise and therefore it may be preferable not to amplify the noise by using a scale factor value less than one. Furthermore, the raw pixel alignment error $e_i$ may be spatially filtered, for instance with a low pass filter, to reject noise received from a prior measurement process, and multiple $e_i$ may be averaged to reject noise received from the prior measurement process.

In a further embodiment, the shift operation of Equation 1 may be applied to a predetermined global PSF, h, in the same direction as $e_i$ rather than directly to the FIR kernel w. In this case, a local PSF $h_i$ is determined for each image region, and the corresponding $w_i$ is determined by an inversion operation such as the zero-forcing method. A person skilled in the art will recognize that other formulae for shifting the FIR kernel w may differ from Equation 1 in manners that do not depart from the spirit and scope of the invention.

Generally, as discussed in the background section, the prior art references contemplate generating a local FIR kernel $w_i$ from scratch, for example, by using the methods of zero-forcing or LMMSE. These methods have the disadvantage that the local FIR kernel $w_i$ derived from sufficiently small local samples of an image tend to be noisy. The method described above addresses this shortcoming by incorporating prior knowledge of the global FIR kernel w, and restricting the degrees of freedom that the local data may affect. The allowed degrees of freedom, such as the x and y pixel alignment error, are expected to have the greatest variation over a real image.

This method may be further generalized by allowing other degrees of freedom in equalizing a holographic image page. In particular, blur is a parameter that may vary locally within an image, or globally over an image. Blur may be incorporated as a locally adjustable parameter according to the present method by deriving a local measurement of the blur, and then altering the local FIR kernel $w_i$ in a manner that compensates for variations in the blur compared to the expected blur in the global FIR kernel, w.

In one embodiment, the blur of the local image region is derived using a variation of the pixel misalignment measurement method of the '769 application as described above. During the calculation of the local pixel alignment error vector, a covariance matrix is generated which measures the cross correlation between zero-mean versions of a small region of the measured image pattern and the corresponding known image pattern. The covariance matrix is used as an estimate of the local PSF $\hat{h}_i$. A first pixel signal error factor (PSEF) (a metric that varies inversely with blur) is derived from the local PSF by calculating the ratio of signal landing in the intended pixel location to signal landing in the neighboring pixel locations (i.e., the ratio of light striking the intended pixel to light striking its neighbors). In another embodiment, the neighboring pixel locations may include locations that are one or more pixels away from the intended pixel of interest. Similarly, a second PSEF is derived from a predetermined global PSF. Then, the first PSEF is divided by the second PSEF to form a pixel-signal-error ratio (PSER). The PSER is then used to adjust the local $w_i$ so as to compensate for the deviation from nominal blur.

In a specific implementation, only the covariance associated with the central element of the PSF, $h_{22}$, and its four nearest neighbors (immediately above, below, to the left, and to the right of $h_{22}$) are computed. The PSER becomes $$err_{PSEF} = \frac{|\hat{h}_{22}|}{|\hat{h}_{12}|+|\hat{h}_{21}|+|\hat{h}_{23}|+|\hat{h}_{32}|} \bigg/ \frac{|h_{22}|}{|h_{12}|+|h_{21}|+|h_{23}|+|h_{32}|}.$$

The local FIR kernel $w_i$ may then be modified by changing only its center element $w_{22}$:

$$w'_{22} = err_{PSEF} w_{22},$$

which adjusts the PSEF of $w_i$ by the same proportion as the detected PSEF changes, thus compensating for the local blur of the local image region.

In an alternative embodiment, the ratio of PSEF is used to equalize the local PSF, $h_i$ directly (i.e., $h'_{22}=err_{PSEF}h_{22}$), which is then used to determine $w_i$ by zero-forcing, linear minimum mean-squared-error or other methods. In yet another alternative embodiment, the applied ratio of PSEF may be rescaled by a factor between the range of $0<ERR_{PSEF}<1$, preferentially closer to 1, in order to minimize the effects of measurement noise. A person of ordinary skill in the art will recognize that different metrics for measuring blur and/or different methods for adjusting the local FIR kernel $w_i$ or the local PSF $h_i$ may be applied without departing from the spirit and scope of the invention.

Figure 2A:
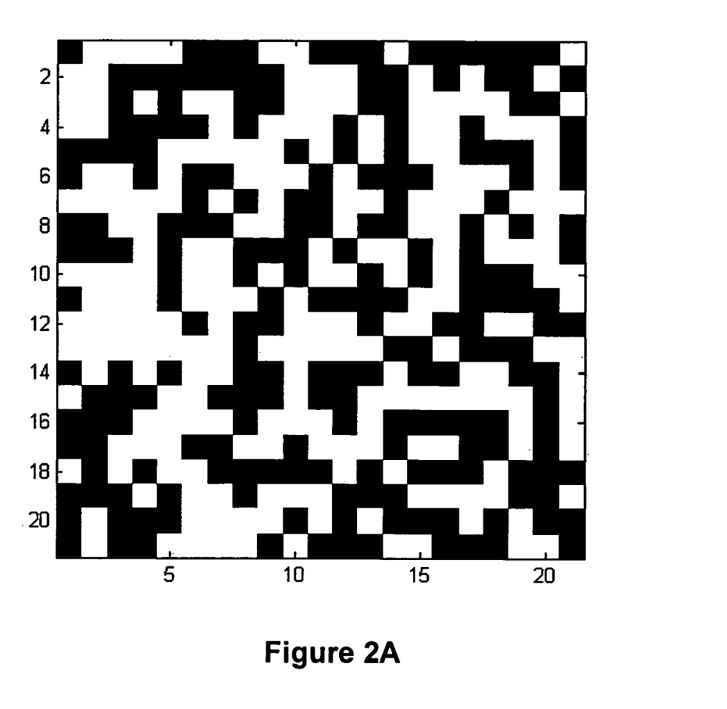
FIG. 2A illustrates an exemplary 21 pixel×21 pixel image data generated by the spatial light modulator.
Figure 2B:
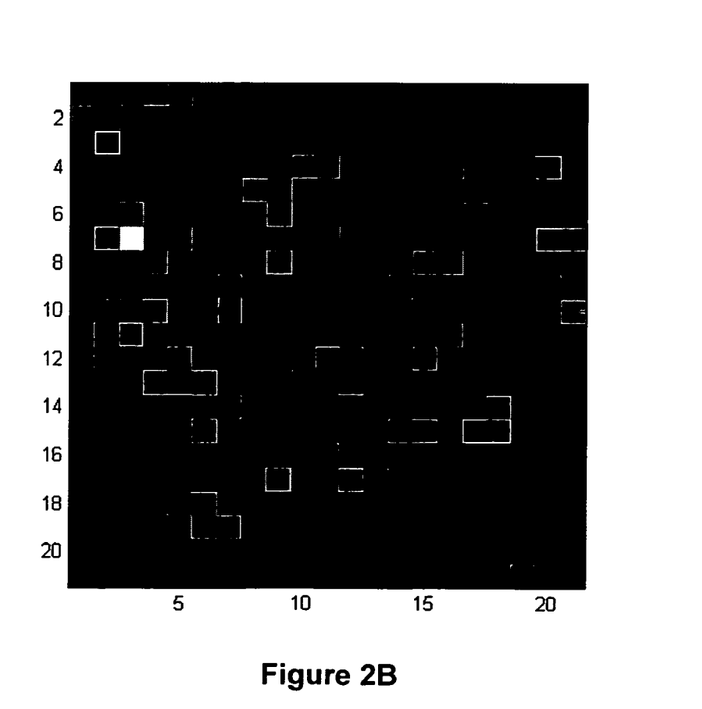
FIG. 2B illustrates the 21 pixel×21 pixel image data of FIG. 2A detected at the output of the holographic data storage system without being processed by the inventive techniques.
Figure 2C:
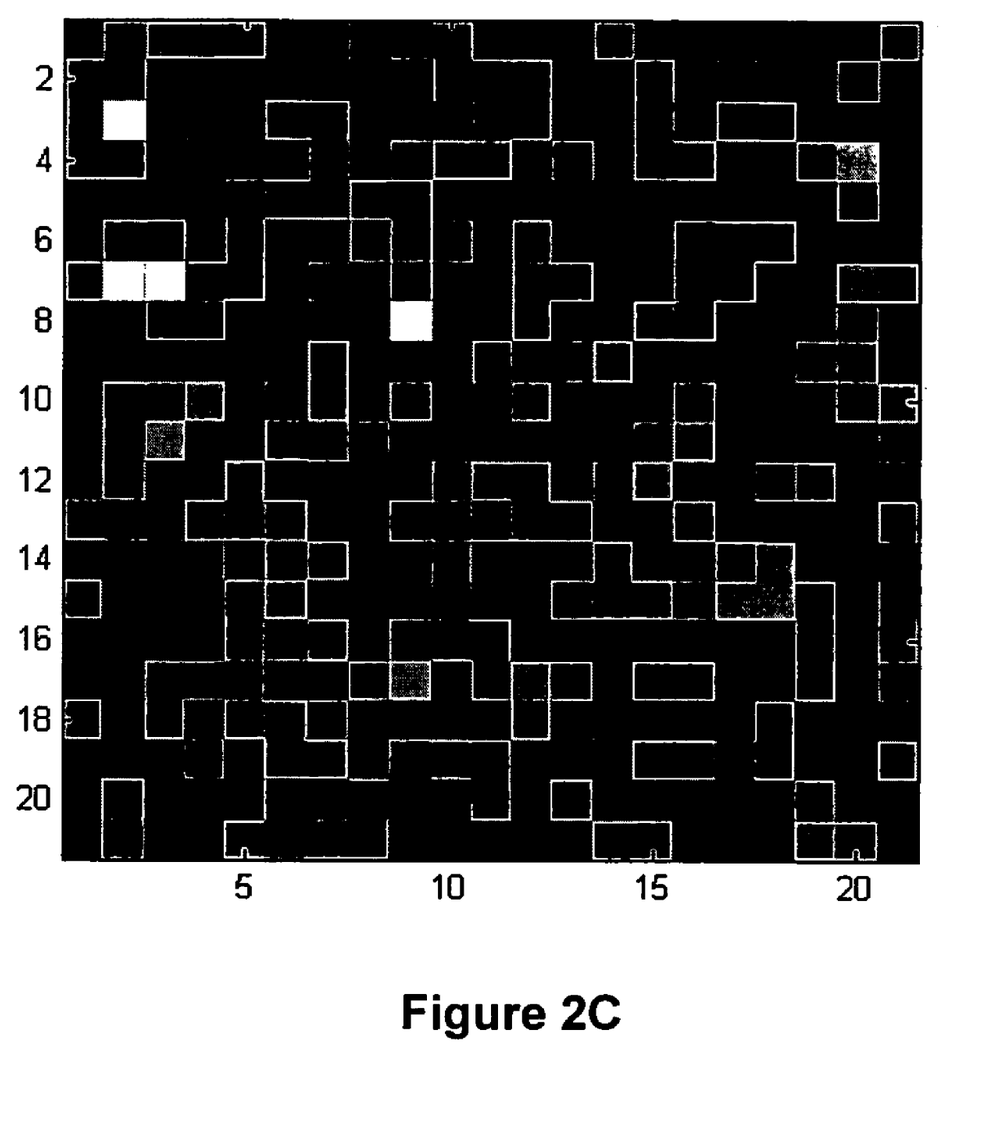
FIG. 2C illustrates the 21 pixel×21 pixel image data of FIG. 2A after being processed according to an embodiment of the present invention.

FIGS. 2A, 2B and 2C illustrate benefits of the locally variable FIR equalization technique according to an embodiment of the present invention. FIG. 2A illustrates an exemplary 21 pixel×21 pixel image data generated by the spatial light modulator. It is a raw image at the input of the holographic data storage system. An ON pixel is represented by a white 1×1 square and an OFF pixel is represented by a black 1×1 square.

FIG. 2B illustrates the 21 pixel×21 pixel image data of FIG. 2A detected at the output of the holographic data storage system without being processed by the inventive techniques. In other words, it is the corresponding image area read at the detector 128 of the holographic data storage system without being processed by the inventive techniques. As shown in FIG. 2B, there are many variations in brightness for the ON pixels, ranging from very bright to grey. For example, there are at least four levels of brightness of the ON pixels, at the coordinates (3, 7), (9, 8), (16, 6) and (16, 3) respectively. Such variations of the ON pixels are difficult to distinguish from OFF pixels. This limitation results in higher bit error rate in the holographic image page, which in turn reduces the storage density of the holographic data storage system.

FIG. 2C illustrates the 21 pixel×21 pixel image data of FIG. 2A after being processed according to an embodiment of the present invention. In other words, the image data read at the detector 128 of the holographic data storage system is processed according to the locally variable FIR equalization technique. Comparing to FIG. 2B, the ON pixels of the image data in FIG. 2C have fewer variations in brightness. The process of imaging through a restricted aperture causes the pixels to be blurred as if by the application of a low-pass spatial filter upon the image field amplitude. The effect is most noticeable in the ON pixels because the varying noise contributions from the neighboring pixels add coherently with the ON signal itself, effectively multiplying the noise in intensity. The technique of channel linearization reverses this process of coherent noise multiplication so that the noise is approximately additive and of equal magnitude for both the ON and OFF pixels. Then, the technique of applying the FIR filter inverts the low-pass blurring process (i.e., the FIR filter is a high-pass equalizer) making the ON and OFF pixels levels less dependent on their neighbors. Furthermore, the technique of varying the FIR filter in accordance with local pixel alignment further improves the performance of the equalizer by restoring the pixel alignment (pixel misalignment being manifested as asymmetrical blur). As a result of these operations, the histograms of the ON and OFF pixels are made narrower and more distinguishable.

Figure 3A:
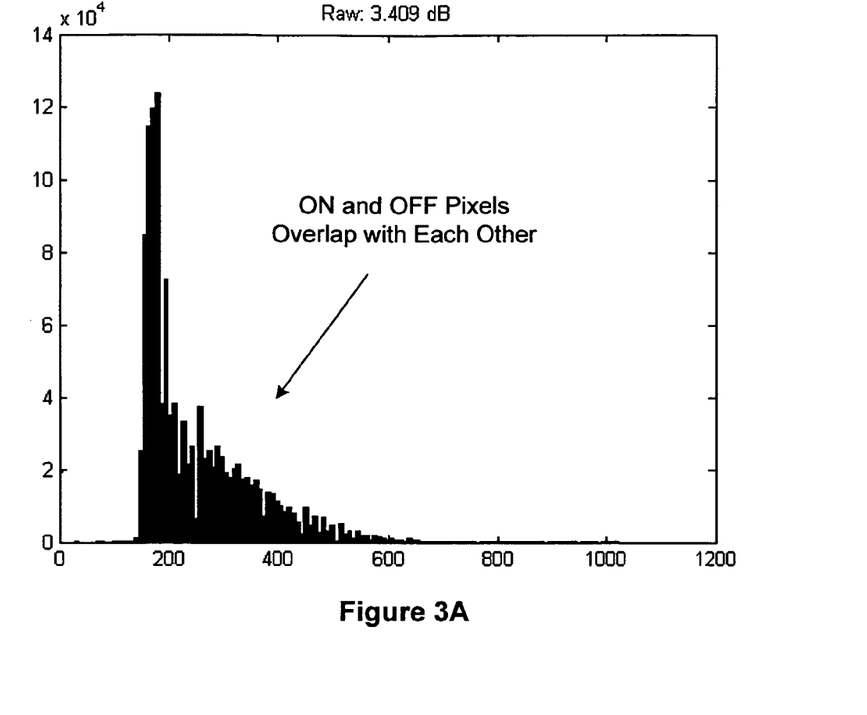
FIG. 3A is a histogram of the unprocessed pixel image data according to an embodiment of the present invention.
Figure 3B:
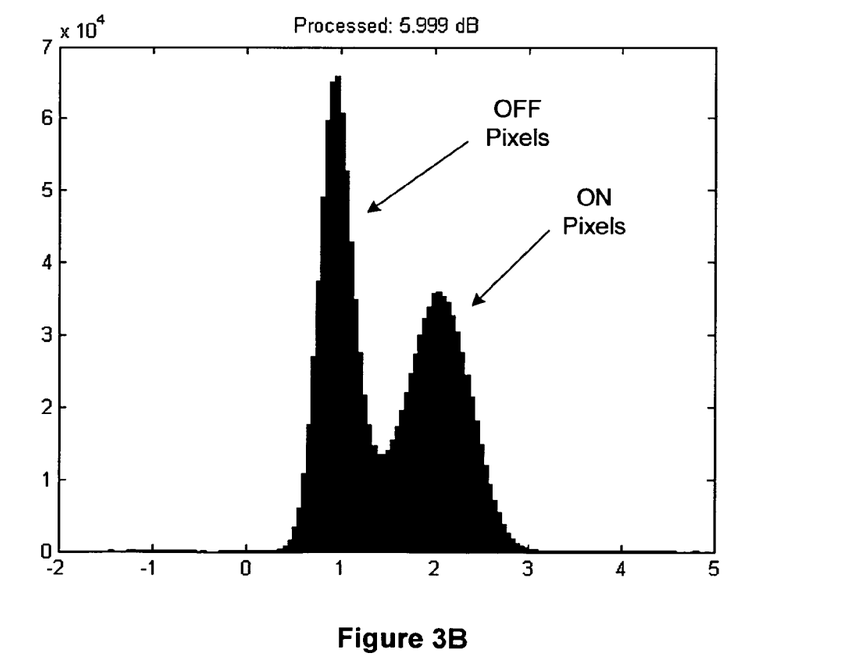
FIG. 3B is a histogram of the processed pixel image data after being processed according to an embodiment of the present invention.

FIGS. 3A and 3B further illustrate the benefits of the locally variable FIR equalization technique according to an embodiment of the present invention. FIG. 3A is a histogram of the unprocessed pixel image data according to an embodiment of the present invention. The vertical axis represents the number of pixels. The horizontal axis represents the pixel brightness at the detector 128. Without applying equalization, there are many variations in brightness of the ON pixels. The majority of the ON pixels have brightness values ranging from 250 to 500, but some ON pixels have brightness values ranges from 600 to over 1000. In this example, the SNR of the raw image data without applying equalization is about 3.409 dB. One of the problems of large variations in brightness of the ON pixels is that the ON pixels overlap with OFF pixels at the low end. Thus, no single threshold may be used to distinguish the ON pixels from the OFF pixels. This limitation results in a higher bit error rate in the holographic image page, which in turn reduces the storage density of the holographic data storage system.

FIG. 3B is a histogram of the processed pixel image data after being processed according to an embodiment of the present invention. The vertical axis represents the pixel count and the horizontal axis represents pixel brightness after equalization. As shown in FIG. 3B, majority the OFF pixels are centered on pixel brightness value of 1 and majority of the ON pixels are centered on pixel brightness value of 2. Thus, there is a clearer separation of the ON pixels and the OFF pixels. In this example, the SNR of the processed image area has improved to 5.999 dB from that of 3.409 dB as shown in FIG. 3A.

To improve the efficiency of the methods of linearization and equalization described above, special data pages may be used to simplify the procedure in determining the coefficients of the global PSF or the global FIR kernel. For example, a page consisting of many isolated pixels spread in known positions over the page may be used. In this context, an isolated pixel is a single ON pixel surrounded by nearest neighbors that are OFF pixels. Analysis of the recovered known pixel pattern for the spatial dependence of the PSF and linearization exponent is simplified because of reduced influence of adjacent pixels.

In addition, known pixel patterns may be employed as part of a calibration procedure for alignment when the holographic drive is first fabricated, and as part of a re-calibration procedure as the holographic drive drifts and ages, or after the holographic drive is subject to mechanical shock and vibration. Using pre-recorded known pixel holograms, the holographic drive may re-calibrate itself and update its filter parameters as needed.

Compensating Nonlinearity of the Holographic Data Storage Channel

As suggested in the background section above, a significant limiting factor on the performance of FIR filtering in relation to a coherent optical data channel is the inherent nonlinearity of the channel. This is because the FIR filtering is tuned to remove the effects of a pixel misalignment on its neighbors as best as possible within a linear regime. Thus, the nonlinearity of the holographic data storage channel needs to be compensated.

Figure 4A:
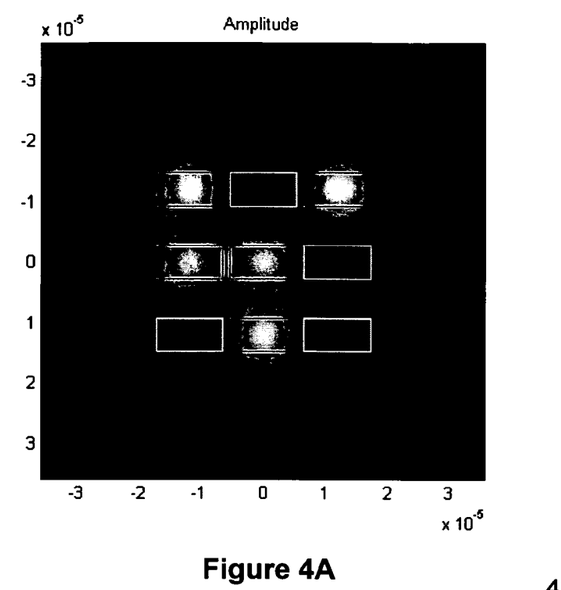
FIG. 4A illustrates a portion of a 3 pixel×3 pixel of an exemplary data image.
Figure 4B:
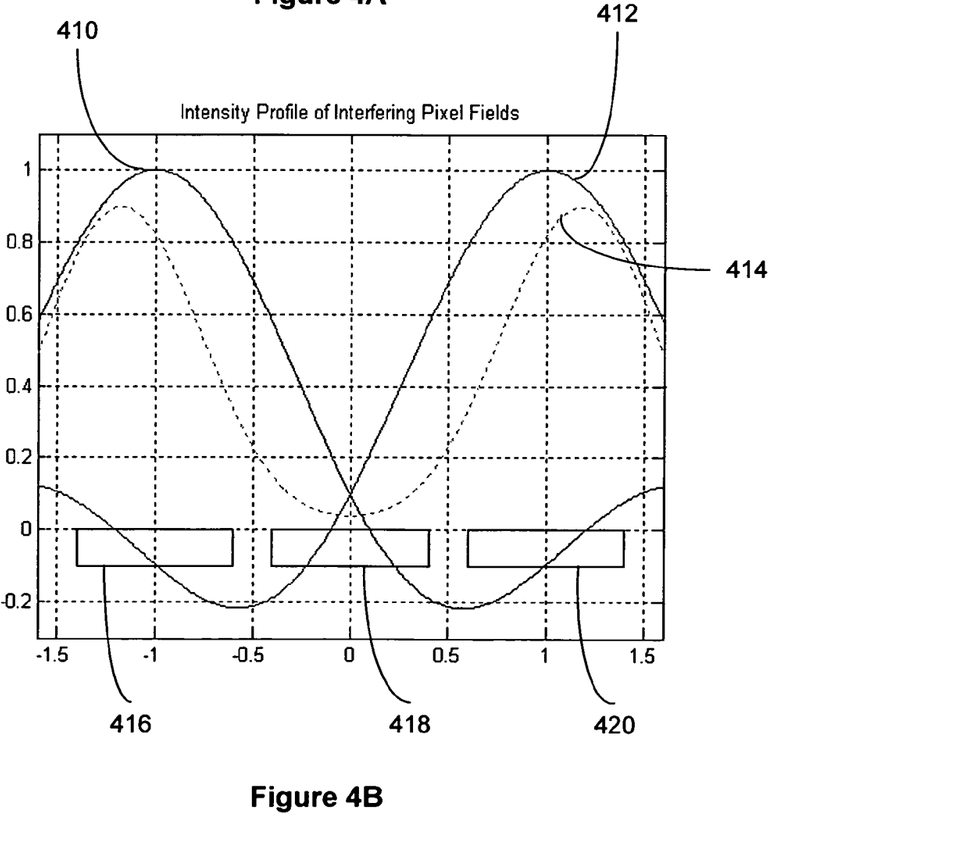
FIG. 4B illustrates an intensity profile resulting from adding and squaring the electric field strengths of pixels in the first row of FIG. 4A according to an embodiment of the present invention.

FIGS. 4A and 4B illustrate the nonlinearity of the holographic data storage channel. FIG. 4A illustrates a portion of a 3 pixel×3 pixel of an exemplary data image. Both the horizontal and vertical axes represent the dimensions of a pixel. An ON pixel is represented by a white spot and an OFF pixel is represented by a dark spot. The first row consists of ON/OFF/ON pixels; the second row consists of ON/ON/OFF pixels; and the third row consists of OFF/ON/OFF pixels. The brightness of a pixel represents the aggregated level of electric field strength squared at that pixel location. Additionally for some OFF pixels, the very dark colors represent electric field strength values inverted with respect to the electric field strength values of the ON pixels. As shown in FIG. 4A, the light of an ON pixel extends into its adjacent pixels thereby creating intersymbol interference. Such intersymbol interferences cause the holographic data storage system to be nonlinear.

FIG. 4B illustrates an intensity profile resulting from adding and squaring the electric field strengths of pixels in the first row of FIG. 4A according to an embodiment of the present invention. Note that as an example, only the intersymbol interference effect between pixels in the first row is shown in FIG. 4B. A person of ordinary skill in the art will recognize that the intersymbol interference effect between pixels from adjacent rows may be analyzed in a similar manner. The horizontal axis represents the distance between the pixels; and the vertical axis represents the electrical field strength of the ON pixels. The curve 410 represents the electric field strength profile over distance for the left ON pixel. The curve 412 represents the electric field strength profile over distance for the right ON pixel. The curve 414 represents the light intensity profile obtained by summing and squaring curves 410 and 412. The box 416 represents the size of the left pixel detector; the box 418 represents the size of the center pixel detector; and the box 420 represents the size of the right pixel detector.

Note that the electric field strength profile from the left ON pixel 410 affects the center OFF pixel as well as the right ON pixel 412. Similarly, the electric field strength profile from the right ON pixel 412 affects the center OFF pixel and the left ON pixel 410. As the image aperture is reduced, the electric field strength of an ON pixel blurs out and lands on the neighboring pixels. In addition, the electric field strength may be a negative value. In other words, the intersymbol interference from one neighbor pixel may not only add to the electric field strength of the neighbor pixel, it may also be subtracted from the neighbor pixel. This characteristic presents another problem to the presumption of a linear channel, which assumes the signal levels of neighbor pixels always add together, but do not subtract from each other.

In one embodiment, the raw signal is linearized by applying a linearization exponent ($\alpha$), to each detected pixel value. The linearization exponent is applied prior to an equalizing operation, such as the FIR filtering, which presumes linearity.

In this approach, the nonlinearity of the channel is measured according to a desired value of a metric corresponding to a desired data accuracy of the holographic data storage system. This approach assumes that the recording data are binary, having states 0 (OFF) and 1 (ON). The approach also assumes a global channel PSF h of finite extent, and that it has vertical and horizontal symmetry. For example, the global PSF h is of the form $$h = \begin{bmatrix} h_4 & h_3 & h_4 \\ h_2 & h_1 & h_2 \\ h_4 & h_3 & h_4 \end{bmatrix}.$$

Since h is presumed zero for all distances greater than one from the center, the intersymbol interferences (ISI) introduced by h into a given pixel is a function of the pixel and its eight immediate neighbors. If the channel is linear, Equation 2 may be used to represent the measured intensity level of a pixel in terms of the channel response and the 512 (i.e. $2^9$) possible states of the 3 by 3 neighbor pixels surrounding the central pixel as $$\begin{bmatrix} I_1 \\ I_2 \\ \vdots \\ I_{512} \end{bmatrix} = X \begin{bmatrix} h_1 \\ h_2 \\ h_3 \\ h_4 \end{bmatrix}. \quad \text{(Eqn. 2)}$$

X is a 512 by 4 matrix, where each row contains the count of the respective terms in h that sum into the center pixel, and the signal intensity level vector I is a 512-element column vector containing the ideal linear intensity level of the center pixel.

In the case of a nonlinear channel, an actual signal intensity level vector I' of detector values taken over all 512 possible pixel neighborhood states may be obtained by either analytical or empirical methods. Then, a fitting error of the actual vector I' versus the ideal linear vector I may be defined as the least squares error (LSE) of signal intensity level as:

$$err_{LS} = \frac{|I - I'|}{|I|},$$

where $err_{LS}$ is used as a metric for adjusting channel linearity.

Given such a metric, the channel performance may be evaluated over a range of linearization exponent ($\alpha$), and a desired linearization exponent is selected that minimizes $err_{LS}$. In one specific implementation, the channel is simulated in the MatLab computer language incorporating the pixel fill factors, linearization exponent ($\alpha$), and the continuous imaging system point spread function. Using the least-squares fitting function LSQNONNEG, the best fitting PSF h may be obtained, as well as the actual channel response I'. The corresponding linear I vector is created by solving Equation 2. Then, the metric $err_{LS}$ is computed by using I and I'.

Figure 5:
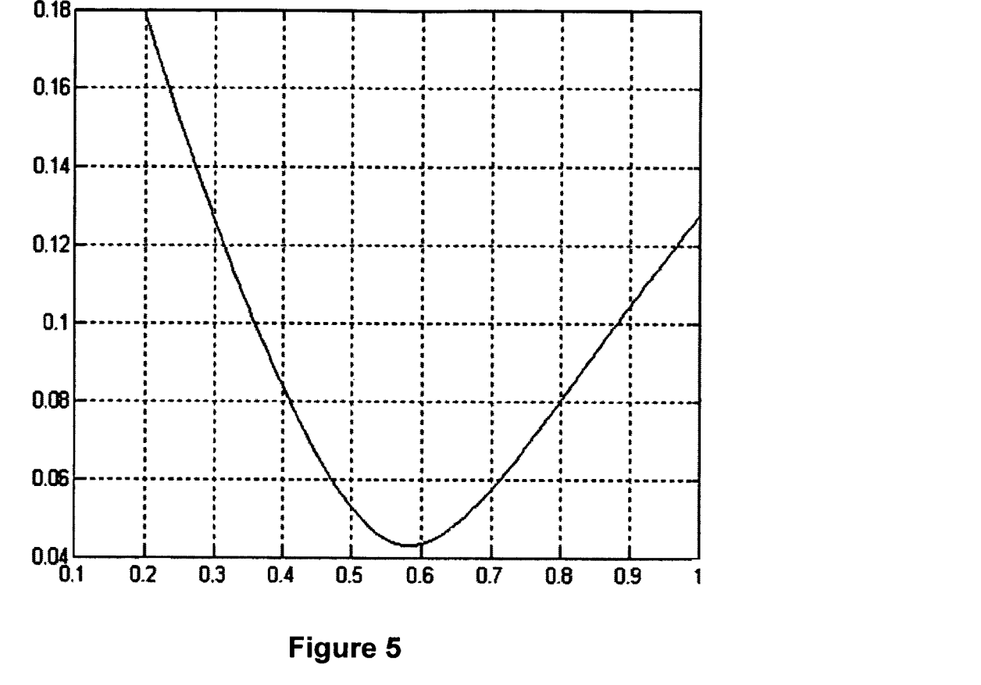
FIG. 5 illustrates a method for selecting a linearization exponent according to an embodiment of the present invention.

FIG. 5 illustrates a method for selecting a linearization exponent according to the method described above. The horizontal axis represents the linearization exponent value. The vertical axis represents the least square error $err_{LS}$, a metric for measuring data accuracy of the holographic data storage channel. In this example, the best linearization exponent value $\alpha$ that generates the lowest $err_{LS}$ is about 0.58, with the corresponding local minimum of $err_{LS}$=0.043 (27.3 dB). For this exemplary holographic data storage system, when the linearization exponent decreases below 0.58, $err_{LS}$ increases; and when the linearization exponent increases above 0.58, $err_{LS}$ also increases. Note that the linearization exponent ($\alpha$) may also be tuned to minimize the bit error rate (BER) of a holographic image page using the method described above.

In yet another embodiment, the linearization exponent ($\alpha$) is optimized subject to a signal-to-noise ratio (SNR), as opposed to the least-squares fitting error of signal intensity level described above. The SNR of the measured values of pixel I' over the states of its neighboring pixels may be calculated. First, divide I' into a first set and a second set, where the first set has the center pixel equal to 1 and the second set has the center pixel equal to 0. Second, calculate the means ($\mu_1$, and $\mu_0$) for the 1's and 0's, respectively. Third, calculate the standard deviations ($\sigma_1$, and $\sigma_0$) for the 1's and 0's, respectively. An ISI limited SNR may then be computed by Equation 3 as $$SNR_{ISI} = \frac{\mu_1 - \mu_0}{\sigma_1 + \sigma_0}. \quad \text{(Eqn. 3)}$$

This SNR only considers noise that is caused by intersymbol interference and therefore it is ISI limited. However, in other embodiments, other sources of noise, for example coherently additive optical noise or detector response variation, may be incorporated into the noise denominator. In addition, alternate definitions of SNR, for example adding root-mean-square noise terms, may be used without departing from the spirit and scope of the invention. Further, the SNR may be calculated from formulae similar to Equation 3 over empirical data collected from actual holograms or from a representative optical imaging system. Furthermore, Equation 2 will have a different form if different assumptions about the size, shape, and symmetry of the global PSF are used. Finally, the metric for optimizing the linearization exponent ($\alpha$) may be derived from the corrected bit error rate at the output or other points in the holographic data storage channel. The bit error rate may be determined analytically or empirically.

Figure 6:
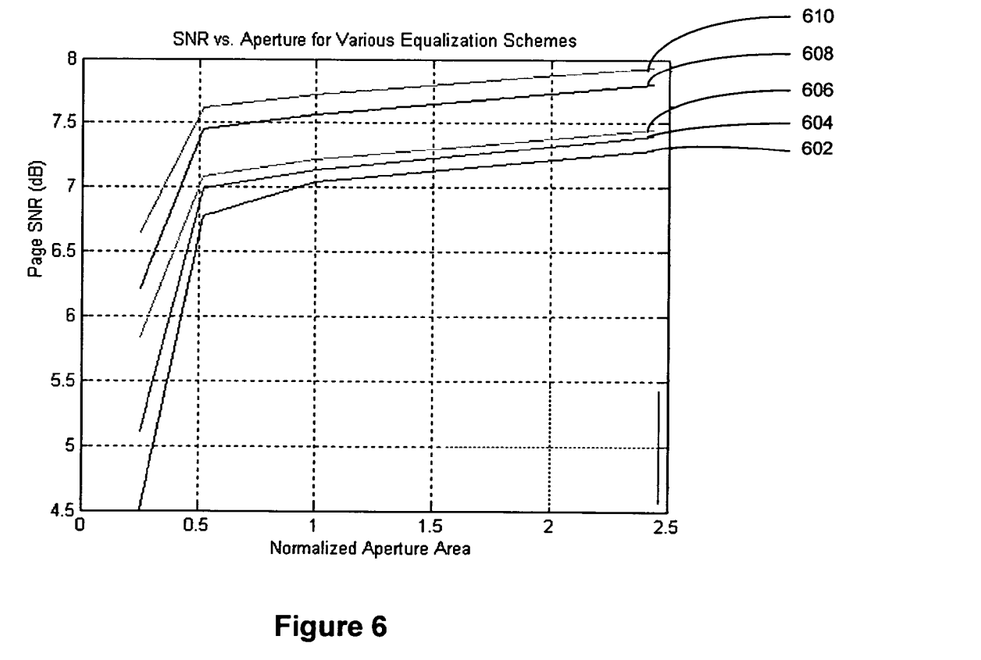
FIG. 6 compares the signal-to-noise ratio versus imaging aperture according to the various equalization schemes discussed.

FIG. 6 compares the signal-to-noise ratio versus imaging aperture according to the various equalization schemes discussed. The figure illustrates improvements of the inventive techniques of equalization and linearization in terms of signal-to-noise ratio over the prior art. The horizontal axis represents an area of the imaging aperture, which determines the PSF of the system. The vertical axis represents the signal-to-noise ratio of the data pages. Curve 602 shows the signal-to-noise ratio of the output image without any equalization or linearization. Curve 604 shows the signal-to-noise ratio achieved by applying a linearization exponent $\alpha$=0.58. Curve 606 shows the effect of filtering a linearized page with a global w kernel determined from the measured PSF by the prior-art method of zero-forcing equalizer. Curve 608 shows the improvement obtained from taking the same global w kernel in curve 606 and modifying it locally in each local image region according to the corresponding measured pixel alignment error of each local image region. Finally, curve 610 shows the improvement obtained from a second iteration by applying the locally variable FIR equalization technique again to the curve 608. As shown in FIG. 6, the inventive methods of linearization and equalization achieve a higher SNR compared to the prior art methods.

The left-most set of data points shows the effects of each scheme at the Nyquist aperture, which is the smallest aperture (and therefore the highest storage density) that adequately samples the information of the data page according to the Nyquist criterion. This configuration also has the widest PSF, and therefore has the most to gain by the method of ISI removal. Thus, the method enables a user to optimize the storage density of the holographic data storage system by choosing a smaller imaging aperture to meet a specific SNR design criteria.

In a different embodiment, a joint iteration method is applied to establish a set of parameters that optimize the performance of the holographic data storage system. In this approach, the set of parameters are iteratively optimized by empirically evaluating their impact on a performance metric such as SNR, $err_{LS}$, or bit error rate. In one specific example of the joint iteration method, the set of parameters $\alpha$, $a_x$, $a_y$, $w_{11}$, and $w_{12}$ are tuned iteratively to improve the performance of the holographic image storage system. Initially, the set of parameters are initialized with certain predetermined values, for example $\alpha=a_x=a_y=1$, and $w_{11}=w_{12}=-1/10$. One or more holographic data images are linearized, equalized, and decoded according to the methods discussed above. (Note that the entire FIR kernel, w, is generated from $w_{11}$ and $w_{12}$ by assuming $w_{22}$ is a one, and that the 3×3 matrix has diagonal and rectangular symmetry.) Next, the decoded image is compared to the original image, and an actual, initial bit error rate is established. Then, an incremental change is made to the first parameter, $\alpha$ (say, incrementing it by $1/10$), and the bit error rate is re-evaluated. If the new bit error rate is lower (better) than the initial bit error rate, then new value of a is kept for subsequent iterations; otherwise the old value of $\alpha$ is kept.

This process is repeated with each of the other parameters ($a_x$, $a_y$, $w_{11}$, and $w_{12}$) to complete the first iteration. Then, the whole process is repeated in subsequent iterations, with each parameter being adjusted (incremented or decremented) by from its last, best known value at each iteration. The direction of the adjustment for each parameter may be alternated, and the magnitude may be shrunk whenever an iteration fails to produce an improvement (e.g., if decrementing $a_x$ by $1/10$ fails to improve the bit error rate, then it will be incremented by $9/100$ on the next iteration). The set of parameters ($\alpha$, $a_x$, $a_y$, $w_{11}$, and $w_{12}$) may converge to values that jointly produce a local minimum value for bit error rate after a number of iterations. When each iteration produces only a negligible change in the overall bit error rate, the procedure is deemed to have converged and the final values of the free parameters are recorded.

Note that the joint iterative method described above is independent of how each individual parameter is obtained. For example, the zero-forcing method may be employed to determine the FIR coefficients, w, from a given pixel spread function, h; or the LMMSE method may be employed to determine w directly from instantiations of the (unequalized) channel response.

One skilled in the relevant art will recognize that many possible modifications of the disclosed embodiments may be used, while still employing the same basic underlying mechanisms and methodologies. The foregoing description, for purpose of explanation, has been described with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and its practical applications, and to enable others skilled in the art to best utilize the invention and various embodiments with various modifications as are suited to the particular use contemplated.

What is claimed is:

1. A method for equalizing a holographic image page, comprising:
   receiving the holographic image page;
   dividing the holographic image page into a plurality of local image regions;
   generating a local alignment error vector for each local image region, wherein the local alignment error vector comprises pixel alignment error information for pixels within the corresponding local image region, wherein the pixel alignment error information comprises a first pixel misalignment in the horizontal direction and a second pixel misalignment in the vertical direction, and filtering each local alignment error vector to remove noise received from a prior measurement process;
   computing, by a processor, a local finite impulse response kernel for each local image region in accordance with the corresponding local alignment error vector; and
   adjusting pixels of each local image region using the corresponding local finite impulse response kernel.

2. The method of claim 1, wherein the step of generating the local alignment error vector further comprises: averaging a plurality of local alignment error vectors to remove noise received from a prior measurement process.

3. The method of claim 1, wherein the step of computing comprises: generating the local finite impulse response kernel by shifting a predetermined global finite impulse response kernel of the holographic image page by the local alignment error vector to reverse effects of pixel alignment error; and storing the local finite impulse response kernel.

4. The method of claim 3, wherein the predetermined global finite impulse response kernel of the holographic image page is determined in accordance with a set of known pixel patterns.

5. The method of claim 1, wherein the step of computing further comprises: shifting the global impulse response kernel by a scaled pixel alignment error, wherein the scaled pixel alignment error is determined by optimizing one or more performance metrics selected from the group consisting of signal-to-noise ratio, bit error rate, and least mean square error.

6. The method of claim 1, further comprising: generating a local pixel spread function by shifting a predetermined global pixel spread function in a direction determined using the local alignment error vector; and computing the local finite impulse response kernel by applying an inversion operation to the local pixel spread function.

7. The method of claim 6, wherein the predetermined global pixel spread function of the holographic image page is determined in accordance with a set of known pixel patterns.

8. The method of claim 6, wherein the inversion operation is a zero-forcing method.

9. The method of claim 1, further comprising: calibrating alignment of the holographic data storage channel in accordance with a predetermined set of known pixel patterns; and re-calibrating alignment of the holographic data storage channel in accordance with the predetermined set of known pixel patterns, wherein the re-calibrating is performed on an as-need basis.

10. The method of claim 9, wherein the predetermined set of known pixel patterns are stored locally and are updated as needed.

11. The computer-implemented method of claim 1, wherein the local alignment error vector comprises two alignment error components, representing an x-misalignment and a y-misalignment respectively.

12. A system for equalizing a holographic image page, comprising:
    at least one microprocessor unit for executing computer programs;
    a memory for storing an operating system, and an application layer;
    a light source for providing a coherent beam of light;

a spatial light modulator for encoding the coherent beam of light; a storage medium for storing an encoded holographic image page; a detector for reading the encoded holographic image page;

one or more microcontrollers for controlling the spatial light modulator and the detector;

means for receiving the holographic image page;

means for dividing the holographic image page into a plurality of local image regions;

means for generating a local alignment error vector for each local image region, wherein the local alignment error vector comprises pixel alignment error information for pixels within the corresponding local image region, wherein the pixel alignment error information comprises a first pixel misalignment in the horizontal direction and a second pixel misalignment in the vertical direction, and filtering each local alignment error vector to remove noise received from a prior measurement process;

means for computing a local finite impulse response kernel for each local image region in accordance with the corresponding local alignment error vector; and means for adjusting pixels of each local image region using the corresponding local finite impulse response kernel.

13. The system of claim 12, wherein the means for generating the local alignment error vector further comprise: means for averaging a plurality of local alignment error vectors to remove noise received from a prior measurement process.

14. The system of claim 12, wherein the means for computing comprise: means for generating the local finite impulse response kernel by shifting a predetermined global finite impulse response kernel of the holographic image page by the local alignment error vector to reverse effects of pixel alignment error; and means for storing the local finite impulse response kernel.

15. The system of claim 14, wherein the predetermined global finite impulse response kernel of the holographic image page is determined in accordance with a set of known pixel patterns.

16. The system of claim 12, wherein the means for computing further comprise: means for shifting the global impulse response kernel by a scaled pixel alignment error, wherein the scaled pixel alignment error is determined by optimizing one or more performance metrics selected from the group consisting of signal-to-noise ratio, bit error rate, and least mean square error.

17. The system of claim 12, further comprising: means for generating a local pixel spread function by shifting a predetermined global pixel spread function in a direction determined using the local alignment error vector; and means for computing the local finite impulse response kernel by applying an inversion operation to the local pixel spread function.

18. The system of claim 17, wherein the predetermined global pixel spread function of the holographic image page is determined in accordance with a set of known pixel patterns.

19. The system of claim 17, wherein the inversion operation is a zero-forcing method.

20. The system of claim 12, further comprising: means for calibrating alignment of the holographic data storage channel in accordance with a predetermined set of known pixel patterns; and means for re-calibrating alignment of the holographic data storage channel in accordance with the predetermined set of known pixel patterns, wherein the re-calibrating is performed on an as-need basis.

21. The system of claim 20, wherein the predetermined set of known pixel patterns are stored locally and are updated as needed.

22. The system of claim 12, wherein the local alignment error vector comprises two alignment error components, representing an x-misalignment and a y-misalignment respectively.

23. A computer readable medium storing computer instructions readable by one or more computer systems, the computer instructions comprising:

an equalization module for equalizing a holographic image page, wherein the equalization module is used in conjunction with at least a microprocessor unit, a memory, a light source, a spatial light modulator, a storage medium, a detector, and one or more microcontrollers, and the equalization module includes one or more computer readable storage media containing instructions for:

receiving the holographic image page; dividing the holographic image page into a plurality of local image regions;

generating a local alignment error vector for each local image region, wherein the local alignment error vector comprises pixel alignment error information for pixels within the corresponding local image region, wherein the pixel alignment error information comprises a first pixel misalignment in the horizontal direction and a second pixel misalignment in the vertical direction, and filtering each local alignment error vector to remove noise received from a prior measurement process;

computing a local finite impulse response kernel for each local image region in accordance with the corresponding local alignment error vector; and adjusting pixels of each local image region using the corresponding local finite impulse response kernel.

24. The computer readable medium of claim 23, wherein the instructions for generating the local alignment error vector further comprise: averaging a plurality of local alignment error vectors to remove noise received from a prior measurement process.

25. The computer readable medium of claim 23, wherein the instructions for computing comprise: generating the local finite impulse response kernel by shifting a predetermined global finite impulse response kernel of the holographic image page by the local alignment error vector to reverse effects of pixel alignment error; and storing the local finite impulse response kernel.

26. The computer readable medium of claim 25, wherein the predetermined global finite impulse response kernel of the holographic image page is determined in accordance with a set of known pixel patterns.

27. The computer readable medium of claim 23, wherein the instructions for computing further comprise: shifting the global impulse response kernel by a scaled pixel alignment error, wherein the scaled pixel alignment error is determined by optimizing one or more performance metrics selected from the group consisting of signal-to-noise ratio, bit error rate, and least mean square error.

28. The computer readable medium of claim 23, further comprising instructions for: generating a local pixel spread function by shifting a predetermined global pixel spread function in a direction determined using the local alignment error vector; and computing the local finite impulse response kernel by applying an inversion operation to the local pixel spread function.

29. The computer readable medium of claim 28, wherein the predetermined global pixel spread function of the holographic image page is determined in accordance with a set of known pixel patterns.

30. The computer readable medium of claim 28, wherein the inversion operation is a zero-forcing method.

31. The computer readable medium of claim 23, further comprising instructions for: calibrating alignment of the holographic data storage channel in accordance with a predetermined set of known pixel patterns; and re-calibrating alignment of the holographic data storage channel in accordance with the predetermined set of known pixel patterns, wherein the re-calibrating is performed on an as-need basis.

32. The computer readable medium of claim 31, wherein the predetermined set of known pixel patterns are stored locally and are updated as needed.

33. The computer readable medium of claim 23, wherein the local alignment error vector comprises two alignment error components, representing an x-misalignment and a y-misalignment respectively.

* * * * *